United States Patent [19]

Seiferth

[11] Patent Number: 4,825,025

[45] Date of Patent: * Apr. 25, 1989

[54] FOOD RECEPTACLE FOR MICROWAVE COOKING

[75] Inventor: Oscar E. Seiferth, Madison, Wis.

[73] Assignee: James River Corporation, Richmond, Va.

[*] Notice: The portion of the term of this patent subsequent to Feb. 3, 2004 has been disclaimed.

[21] Appl. No.: 153,505

[22] Filed: Feb. 4, 1988

Related U.S. Application Data

[60] Continuation of Ser. No. 9,264, Jan. 30, 1987, abandoned, which is a division of Ser. No. 820,593, Jan. 2, 1986, Pat. No. 4,641,005, which is a continuation of Ser. No. 21,258, Mar. 16, 1979, abandoned.

[51] Int. Cl.[4] .................................................. H05B 6/80
[52] U.S. Cl. ....................... 219/10.55 E; 219/10.55 F; 426/107; 426/243; 126/390; 99/DIG. 14
[58] Field of Search ................ 219/10.55 E, 10.55 M, 219/10.55 F; 99/451; 229/3.5; 426/107, 113, 124, 234, 241, 237, 243, 392, 396, 412; 126/390; 156/233; 428/425.8, 457, 458; 427/250, 404

[56] References Cited

U.S. PATENT DOCUMENTS

| | | | |
|---|---|---|---|
| 2,582,174 | 1/1952 | Spencer | 219/10.55 E |
| 2,830,162 | 4/1958 | Copson et al. | 219/10.55 E |
| 2,902,396 | 9/1959 | Reynolds | 229/3.5 MF |
| 3,160,280 | 12/1964 | Burch . | |
| 3,258,649 | 6/1966 | Arguin . | |
| 3,302,350 | 2/1967 | Brown et al. . | |
| 3,302,632 | 2/1967 | Fichter | 219/10.55 E |
| 3,353,968 | 11/1967 | Krajewski | 219/10.55 E |
| 3,490,580 | 1/1970 | Brumfield | 219/10.55 E |
| 3,701,872 | 10/1972 | Levinson | 219/10.55 E |
| 3,773,669 | 11/1973 | Yamauchi | 219/10.55 E |
| 3,783,220 | 1/1974 | Tanizaki | 219/10.55 E |
| 3,850,301 | 11/1974 | Flenige . | |
| 3,853,612 | 12/1974 | Spanoudis | 219/10.55 E |
| 3,854,023 | 12/1974 | Levinson | 219/10.55 E |
| 3,865,301 | 2/1975 | Pothier et al. | 219/10.55 E |
| 3,941,967 | 3/1976 | Sumi et al. | 219/10.55 E |
| 3,946,188 | 3/1976 | Derby | 219/10.55 E |
| 3,965,323 | 6/1976 | Forker, et al. | 219/10.55 E |
| 3,984,598 | 10/1976 | Sarazin et al. | 156/233 X |
| 4,002,953 | 1/1977 | Pertetlie . | |
| 4,003,840 | 1/1977 | Ishino et al. | 219/10.55 |
| 4,015,085 | 3/1977 | Woods | 219/10.55 E |
| 4,144,438 | 3/1979 | Gelman et al. | 219/10.55 E |
| 4,172,914 | 10/1979 | Festag et al. | 428/425.8 X |
| 4,190,757 | 2/1980 | Turpin et al. | 219/10.55 E |
| 4,210,124 | 7/1980 | Husslein | 126/390 |
| 4,228,334 | 10/1980 | Clark et al. | 219/10.55 E |
| 4,230,924 | 10/1980 | Brastad et al. | 219/10.55 E |
| 4,258,086 | 3/1981 | Beall | 219/10.43 |
| 4,267,420 | 5/1981 | Brastad | 219/10.55 E |
| 4,283,427 | 8/1981 | Winters et al. | 426/107 |
| 4,473,422 | 9/1984 | Parker et al. | 156/233 |
| 4,553,357 | 11/1985 | Pepper . | |
| 4,641,005 | 2/1987 | Seiferth | 219/10.55 E |
| 4,735,513 | 4/1988 | Watkins et al. | 219/10.55 E |

FOREIGN PATENT DOCUMENTS 841015 7/1960 United Kingdom .

OTHER PUBLICATIONS

Catalog 101, RDI, Snadtrack Sockets, CDPT., 1976, pp. 1–12.

Primary Examiner—Philip H. Leung
Attorney, Agent, or Firm—Sixbey, Friedman, Leedom & Ferguson

[57] ABSTRACT

A disposable food receptacle for use in microwave cooking is disclosed which includes a provision to brown the exterior of the food in the receptacle. A thin layer of an electrically conductive material, such as an elemental metal is incorporated into the receptacle on the food contacting surfaces thereof, so that the conductive layer will become heated by the microwave radiation and will, in turn, brown the exterior of the food in the receptacle. The conductive layer is formed as an extremely thin film deposited on a substrate protective layer by a process of vacuum vapor deposition.

40 Claims, 1 Drawing Sheet

FOOD RECEPTACLE FOR MICROWAVE COOKING

This application is a continuation of application Ser. No. 009,264, filed Jan. 30, 1987, which is a divisional of Ser. No. 820,593, filed Jan. 2, 1986, now U.S. Pat. No. 4,641,005, which is a continuation of Ser. No. 21,258, filed Mar. 16, 1979, abandoned.

BACKGROUND OF THE INVENTION

1. Field of the Invention

The present invention relates to food packages in general, and in particular, to food receptacles for use in the microwave cooking of foods which incorporate therein provisions for the browning of the exterior of the food in the receptacle.

2. Description of the Prior Art

It is of general concern in the art of microwave cooking that the exterior of the food being cooked is browned so as to more closely resemble food cooked by conventional methods. If a special provision is not made for browning the exterior of the food, the exterior of the food cooked in a microwave oven will remain undercooked because of the surface cooling effect of the food as it is heated by microwave radiation. Therefore it has been a general object within the art of microwave cooking of foods to perfect an economical and efficient method for browning the exterior of the foods being cooked in a microwave oven.

The prior art is generally cognizant, therefore, of various attempts to incorporate layers into receptacles used for the microwave cooking of foods, which layers are designed to be particularly susceptible to being heated by microwave radiation. Such layers are conventionally made of semiconductive materials such as tin oxide. Examples of U.S. Pat. Nos. showing the use of such layers can be seen in U.S. Pat. Nos. 3,853,612, and 3,965,323. Other examples of methods used to obtain browning heat from microwave radiation are shown in U.S. Pat. Nos. 2,582,174, 3,701,872, 3,773,669, and 4,003,840.

In addition at least one example is known of a method of heating foods in a microwave oven which incorporates therein the use of ferro-magnetic metals. Such example is shown in U.S. Pat. No. 2,830,162. In addition at least one U.S. Pat. No. teaches the incorporation of an electrically conductive film in a ceramic dish or other heavy vessel for use in the browning of foods cooked in a microwave oven. However, the examples shown in that patent, which is U.S. Pat. No. 3,783,220, are directed to a film of tin oxide, with alternative substances disclosed being cellulose fiber and silicon carbide. No example of such a container for use in the browning of foods in a microwave oven is known in the prior art which incorporates therein the use of an elemental metal, nor the use of an extremely thin conductive film on a low cost, disposable substrate.

SUMMARY OF THE INVENTION

The present invention is summarized in that in a food preparation receptacle for use in microwave cooking of foods there is an improvement including a layer of electrically conductive elemental metal being incorporated into the receptacle, the layer of metal being sufficiently thin so as to be rapidly heated upon expose to microwave radiation and cause surface browning of the food in the receptacle.

It is a primary object of the present invention to provide a means for the browning of foods cooked in a microwave oven which can be incorporated into disposable packages or receptacles for pre-packaged or frozen food.

It is another object of the present invention to construct a suitable food package which incorporates therein such a provision for browning the exterior of the food to be cooked in a microwave oven.

It is yet another object of the present invention to incorporate a provision for such browning of foods during microwave cooking which is economical and efficient in its operation.

Other objects, advantages, and features of the present invention will become apparent from the following specification when taken in conjunction with the accompanying drawings.

DESCRIPTION OF THE PREFERRED EMBODIMENT

Figure 1:
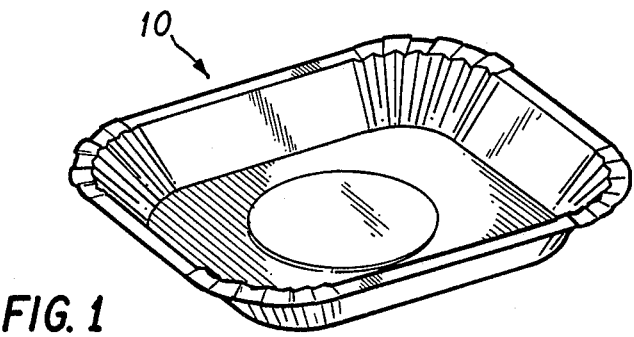
FIG. 1 is a perspective view of a food package constructed in accordance with the present invention.

Shown in FIG. 1 is a food receptacle for use in microwave cooking, generally indicated at 10, constructed in accordance with the present invention. The receptacle 10, as shown in FIG. 1, is a four-sided generally tray shaped package for receiving a prepared quantity of food material therein. The receptacle 10 as shown includes shallow sides and a wide bottom and may or may not include a top covering thereover, or may be constructed in any desired geometry or shape depending on the contents to be carried by the receptacle 10. The receptacle 10 is designed especially so as to be disposable, and is therefore constructed of economical commercially available components.

Figure 2:
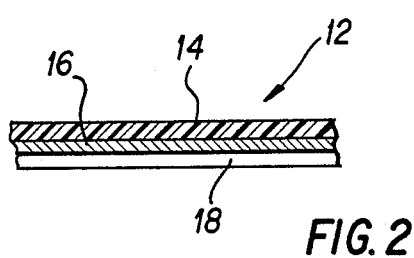
FIG. 2 is an enlarged cross-sectional view of the material of the package of FIG. 1.

Shown in FIG. 2 is a cross-sectional diagram of the package material from which the package 10 of FIG. 1 is constructed. This package material, which is indicated at 12 in FIG. 2, includes generally three layers. The uppermost layer as illustrated in FIG. 2, which is designed to be the layer most near to the food product, is a high heat tolerant protective layer 14. Formed underneath the protective layer 14 is an extremely thin layer of conductive material, such as vacuum vapor deposited electrically conductive elemental metal 16, for example a thin layer of elemental aluminum. The combination of the protective layer 14 with the metal layer 16 adhered thereto is mounted on a base layer of structural stock material 18. The function of each of these layers will be described in turn.

The function of the stock material 18 is to provide structural rigidity and support for the physical shape of the package 10. whatever the configuration of the package 10 may be. The stock material layer 18 is preferably formed of a low density material having a relatively high insulating capacity and a heat stability sufficient to withstand cooking temperatures in a microwave oven. Suitable materials for use as this stock material are papers, glassine materials, plastics, ceramics and various coated papers. Preferred materials for use in disposable receptacles include coated kraft paper and other conventional kraft paper combinations conventionally used for paperboard cartons and packages.

The function of the protective layer 14 is to ensure that the food product inside of the receptacle 10 does not contact either the metal layer 16 or the stock material layer 18. The protective layer 14 also serves as a stock material onto which the metal layer 16 may be deposited during the construction of the package material 12. Suitable materials for use in constructing the protective layer 14 include polyesters, polyethylene, nylon, cellophane, polysulphone, and other relatively stable plastic substances. It is important that the material of the protective layer 14 be of sufficient stability at high temperatures that it will not degrade during the operation of the microwave oven at the temperature selected for cooking the desired food. It has been found that polyester is a particularly well suited material for use as the protective layer 14 in view of its stability and its surface smoothness.

Also included within the package material 12 is the metal layer 16 bonded to the rear surface of the protective layer 14 and the food contacting surface of the stock material 18. The metal layer 16 is formed as a vacuum vapor deposited film of electrically conductive elemental metal, which, as stated above, is preferably deposited on the lower surface of the protective layer 14 before such layer is bonded to the stock material 18. It is a primary characteristic of the metal layer 16 that it is extremely thin in terms of its mechanical thickness. In fact, under current technology it is virtually impossible to mechanically measure the exact thickness of the layer of the metal film 16. In the general art of vacuum vapor deposition, it is therefore conventional to measure the thickness of vacuum vapor deposited layers of electrically conductive metal material in terms of the surface resistivity of the metal layer itself. This is possible inasmuch as these deposited metal layers are so thin that they have an appreciable and easily measurable resistance to the flow of electric current such as is not the case in conventional thickness metal films or foils. Having measured the electrical resistivity of a metal layer, it is possible with a reasonable degree of certainty to approximate the mechanical thickness of such a layer, based on the amount of metal material applied to a given square area during the application of the metal layer onto the substrate, which in this case is the protective layer 14. It is to be understood however, that the film of the metal layer 16 is of such a thinness that direct measurement of its dimensions are impossible, and such measurements must be made indirectly. Such films are conventionally so thin that when deposited on transparent materials they may readily be seen through by the human eye.

A film of the type of the metal layer 16 in the package of the present invention serves to provide a browning function in a package for food when cooked in a microwave oven. In conventional microwave cooking, it is normally believed that it is bad practice to include utensils or packages incorporating therein any significant amounts of elemental conductive metals. Many microwave oven manufacturers include instructions with their ovens warning against the use of aluminum or similar metal utensils within the microwave oven. Such warnings are included to avoid a reflection problem inasmuch as microwaves are unable to penetrate such metal utensils and are reflected backwardly therefrom. Such reflections can result in areas of food within the oven not being cooked, and can potentially, in some situations, cause damage to the klystron of the microwave oven. It is also readily observable that conventional foil products such as aluminum foil do not heat up when subjected to microwave radiation, thus making such material inoperative as a heat source for surface browning of foods in a microwave oven.

Applicant has found, however, that when a metal layer 16 is of sufficient thinness, it surprisingly does not detract from the operation of the microwave oven and, apparently because of its incomplete reflection of the microwaves incident thereon is, in fact, heated very efficiently by the microwave oven. Thus, when the receptacle 10 of the present invention with food therein is placed within a microwave oven and subjected to microwave radiation, the metal layer 16 rapidly heats to a relatively high temperature. The heat generated by the metal layer 16 acts to brown the surface of the food contained within the receptacle 10. Such browning effect is a significant advantage in receptacles for food designed to be cooked in microwave ovens.

In conducting experimentation upon the use of the metal layer 16 and receptacles for use in cooking foods in a microwave, a variety of different thickness of the metal layer 16 have been used with success. It has been generally found that metal layers 16 having a surface resistance which varies between about 0.4 and 8 ohms per square inch offer satisfactory results in a receptacle according to the present invention. As stated, the thickness of this material is not directly mechanically measurable, but appropriate calculations indicate that a film of aluminum in the metal layer 16 would have a thickness of between 200 and 300 angstroms if its resistance was 1.5 ohms per square inch. Using such numbers as a basis for calculation, it is believed that for the metal aluminum, thicknesses having a surface resistance of between 0.4 and 8 ohms per square inch vary in thickness between approximately 700 and 40 angstroms.

Such films as the metal layer 16 may be deposited on substrates, in this case the protective layer 14, most efficiently through the use of vacuum vapor deposition. Such technique involves the melting of elemental metal material in a vacuum chamber and drawing the substrate through the vacuum chamber in close proximity to the melted metal material. The molten metal material emits a metallic vapor which is deposited on the substrate as it moves through the chamber, and the amount of material deposited on the substrate may be adjusted by the rate at which the substrate moves through the vacuum chamber. It is believed that such vaccum vapor deposition technique is the most efficient manner for making the metal layer 16 usable within the present invention. It is an advantage of such materials that many types of such materials, such as aluminum coated on polyester, usable in the present invention, are readily commercially available at the present time.

The exact upper limit of the metal layer 16 usable in the present invention is not readily determinable using currently commercially available products. For example, the thinnest commercially available film or foil of aluminum material that is pin-hole free has a thickness of approximately 0.00035 inches. This thickness corresponds to approximately 87,000 angstroms. Experimentation has shown that this thickness is too great to allow this foil to heat up upon exposure to microwaves. The gap between the thinnest commercially available foils, i.e. the 0.00035 inch foil, and the vacuum vapor deposited films presently marketed is presently about two orders of magnitude, and no materials are readily available on the shelf between these thicknesses. It is believed by the applicant that metal films for use within the metal layer 16 of the present invention may prove functional at some thickness greater than that described in this application. However the exact limit of mechanical thickness is unknown at present.

In order for a technology to be useful for forming the metal layer 16 of the present invention, the metal layer 16 must be of such thinness as to be readily and rapidly heated upon the exposure thereto by microwave radiation. Such heating of such a metal layer 16 must be rapid, which as used herein is meant to mean that the heating must occur within a sufficient amount of time and reach a sufficient temperature so as to be capable of browning the exterior of foods during the normal cooking time of such foods in a microwave oven. As for example, it has been found that a vacuum vapor deposited metal layer 16 having a surface resistance of approximately 2 ohms per square inch is capable of achieving a temperature in excess of 200° within 30 seconds. Similarily, a metal layer 16 having a surface resistance approximately equaling 4 ohms per square inch will achieve a temperature exceeding 200° in a time period between 20 and 30 seconds. There appears to be a generally linear relation between the surface resistivity of the metal film used for the metal layer 16, and the amount of time required to achieve a certain temperature for that metal layer when exposed to microwave radiation. The more surface resistance of the metal layer, the faster the metal layer 16 heats upon exposure to microwave radiation. In any event, it is necessary for a metal layer 16 which is to be used within the receptacle 10 of the present invention to achieve and hold a browning temperature, which is generally in excess of 200° F., within a period of time short enough so as to brown the exterior of the food during the time necessary to cook the food received within the receptacle 10.

Figure 3:
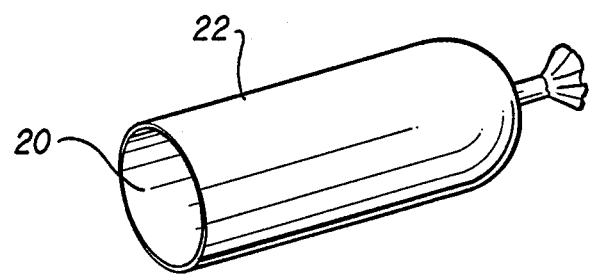
FIG. 3 is a perspective view of an alternative embodiment of a food package constructed in accordance with the present invention.
Figure 4:
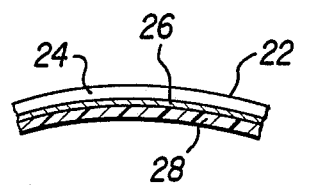
FIG. 4 is an enlarged cross-sectional view of the material of the package of FIG. 3.

Shown in FIG. 3 is an alternative embodiment of a food receptacle constructed in accordance with the present invention. The receptacle of FIG. 3, generally indicated at 22, is intended to encase therein a quantity of sausage 20 or similar sausage type material. The receptacle 22 is formed as a thin wrapping of material about the exterior of the sausage 20. FIG. 4 shows an enlarged view of the package material of the package 22. Similar to the receptacle 10, the receptacle 22 includes a protective layer 28 upon the back of which a vacuum vapor deposited metal layer 26 is arranged. The combination of a protective layer 28 and the metal layer 26 is received inside a stock material 24 which wraps around the exterior of the receptacle 22. The stock material 24 of the receptacle 22 is selected so as to be much more flexible than the stock material 18 of the receptacle 10.

The receptacle 22 of FIGS. 3 and 4 functions in much the same way as the receptacle 10 of FIGS. 1 and 2. Upon exposure to microwave radiation, the receptacle 22 serves to brown the exterior of the sausage 20 received within the receptacle 22. Such exterior browning is extremely helpful in the art of sausage making inasmuch as it sterilizes and seals the exterior of the sausage 20. By using a receptacle 22 constructed in accordance with the present invention, it is possible for such sterilization and sealing to be accomplished in an efficient and economical manner by the exposure of finished sausages 20 encased in the receptacle 22 to microwave radiation at the processing plant.

It is envisioned that many types of receptacles for use within the present invention may be constructed utilizing the metal layer 16 therein. Thus it is envisioned that many disposable-type receptacles for use in the microwave cooking of convenience, frozen, or other prepackaged foods may be constructed. In addition it is also envisioned that a metal layer 16 may be incorporated into a receptacle such as serving dishes, plates, or casserole dishes which are not, of course, of a disposable nature and are more in the nature of housewares to be readily reused by a homemaker during the preparation of foods in a microwave oven. It is also envisioned that the receptacle including the metal layer 16 according to the present invention may be any of a wide variety of wrappings which are used to wrap foods, such as is shown in the sauage package 22 of FIGS. 3 and 4.

It is a particular advantage of the present invention, however, in that it allows the construction of a disposable receptacle which includes a provision for the browning of food in a microwave oven whether the layer 16 is formed of metal or other conductive material. Prior art receptacles for browning microwave cooked foods have been large, massive and relatively expensive articles entirely unsuited for food packaging but usable only as dishes or cooking utensils. By combining readily available and economical materials in the receptacle of the present invention, a food package can be constructed which can be used to package the food for the consumer and for its cooking and browning in a microwave oven, after which the package can be discarded. This result was not possible in the prior art. Furthermore because conductively coated polyester and paperboard materials, which are the preferred materials for such a package, are relatively light and of low density, they make more efficient use of the microwave energy absorbed than would a heavy ceramic or glassine utensil which requires a substantial amount of heating before it becomes hot to the touch. Thus a food package, such as the receptacle 10 of FIGS. 1 and 2, constructed in accordance with the present invention offers a significant advance in the art of browning devices for foods cooked in microwave ovens by enabling a disposable device capable of effective and efficient operation.

It is further envisioned that a number of metals other than aluminum may be used for the metal layer 16 when that layer is used in a receptacle according to the present invention. It is believed important, however, that the material for use in the metal layer 16 be an elemental metal and that the metal be of an electrically conductive character. Other suitable metals for use within the metal layer 16 include copper, tin, lead, silver, gold, nickel, and zinc, although some of those obviously would not be chosen for disposable receptacles because of cost considerations. It is also envisioned that combinations or alloys of these metals are also usable in the present invention. While the exact thickness of the metal layer 16 necessary to achieve a browning effect may vary with the metal utilized for the metal layer 16, it is envisioned that any such metals would be most efficiently used in constructing such a layer by vacuum vapor deposition, and that the surface conductivity of the metal layer 16 would be approximately equivalent for the different metal materials when used within a receptacle in accordance with the present invention.

It is to be understood that the present invention is not limited to the particular construction and arrangement of parts disclosed and illustrated herein, but embraces all such modified forms thereof as come within the scope of the following claims.

I claim:

1. A laminate for use in a disposable container adapted to heat the surface of a quantity of food when exposed to microwave energy, said laminate comprising
   (a) a continuous microwave interactive layer of electrically conductive metal having a thickness which is sufficiently small to cause said microwave interactive layer, when subjected to microwave energy, to heat up to a temperature which is sufficient to heat the surface of food in heat transfer relationship therewith,
   (b) protective means for said microwave interactive layer, said protective means including a smooth surfaced plastic film having sufficient stability at high temperature that it will not degrade when the laminate is subjected to sufficient microwave energy to heat the surface of the quantity of food, and
   (c) support means for providing structural support for said interactive layer and said plastic film, said support means being formed of paper stock material having sufficient structural stability at the high temperature necessary for heating the surface of the quantity of food to maintain its physical shape; wherein said laminate is formed by the process including the successive steps of vacuum depositing said microwave interactive layer onto a smooth surface of said plastic film followed by the step of bonding directly said plastic film upon which said microwave interactive layer has been vacuum deposited to one side of said paper stock material in a manner to cause said plastic film and said microwave interactive layer to be held in bonded relationship with said support means to cause the surface of a quantity of food, when in heat transfer relationship therewith, to be heated when the laminate is subjected to microwave energy.

2. A laminate according to claim 1, wherein the step of bonding said plastic film to said paper stock material includes the step of bonding directly to said paper stock material the side of said plastic film upon which said interactive layer has been vacuum deposited.

3. A laminate according to claim 1, wherein said plastic film is adapted to directly contact the surface of the quantity of food.

4. A laminate according to claim 1, wherein said microwave interactive layer has a thickness of less than about 700 angstroms.

5. A laminate according to claim 1, wherein said microwave interactive layer has a resistivity of greater than about 0.4 ohms per square.

6. A laminate according to claim 1, wherein said laminate includes a tray member of predetermined physical shape.

7. A laminate according to claim 1, wherein said step of vacuum depositing includes the step of vacuum vapor depositing said metal onto said plastic film.

8. A laminate according to claim 1, wherein said paper stock material is formed of a material constituting a greater barrier to heat transfer than said plastic film.

9. A food package including a laminate according to claim 1, wherein said food package includes means for at least partially encompassing food to be surface heated by said laminate when exposed to microwave energy.

10. A laminate for use in a disposable container adapted to heat the surface of a quantity of food when exposed to microwave energy, said laminate comprising
    (a) a continuous microwave interactive layer of elemental metal having a thickness which is sufficiently small to cause said microwave interactive layer, when subjected to microwave energy, to heat up to a temperature which is sufficient to heat the surface of food in heat transfer relationship therewith,
    (b) protective means for said microwave interactive layer, said protective means including a smooth surfaced plastic film having sufficient stability at high temperature that it will not degrade when the laminate is subjected to sufficient microwave energy to heat the surface of the quantity of food, and
    (c) support means for providing structural support for said interactive layer and said plastic film, said support means being formed of microwave transparent stock material having sufficient structural stability at the high temperature necessary for heating the surface of the quantity of food to maintain its physical shape; wherein said laminate is formed by the process including the successive steps of vacuum depositing said microwave interactive layer onto a smooth surface of said plastic film followed by the step of bonding directly said plastic film upon which said microwave interactive layer has been vacuum deposited to one side of said stock material in a manner to cause said plastic film and said microwave interactive layer to be held in bonded relationship with said support means to cause the surface of a quantity of food, when in heat transfer relationship therewith, to be heated when the laminate is subjected to microwave energy.

11. A laminate according to claim 10, wherein the step of bonding said plastic film to said stock material includes the step of bonding directly to said paper stock material the side of said plastic film upon which said interactive layer has been vacuum deposited.

12. A laminate according to claim 10, wherein said plastic film is adapted to directly contact the surface of the quantity of food.

13. A laminate according to claim 10, wherein said microwave interactive layer has a thickness of les than about 700 angstroms.

14. A laminate according to claim 10, wherein said microwave interactive layer has a resistivity of greater than about 0.4 ohms per square.

15. A laminate according to claim 10, wherein said laminate includes a tray member of predetermined physical shape.

16. A laminate according to claim 10, wherein said step of vacuum depositing includes the step of vacuum vapor depositing said metal onto said plastic film.

17. A laminate according to claim 10, wherein said stock material is formed of a material constituting a greater barrier to heat transfer than said plastic film.

18. A food package including a laminate according to claim 10, wherein said food package includes means for at least partially encompassing food to be surface heated by said laminate when exposed to microwave energy.

19. A laminate for use in a disposable container adapted to heat the surface of a quantity of food when exposed to microwave energy, said laminate comprising
    (a) a continuous microwave interactive layer of elemental metal having a thickness which is sufficiently small to cause said microwave interactive layer, when subjected to microwave energy, to heat up to a temperature which is sufficient to heat the surface of food in heat transfer relationship therewith, (b) receiving means for said microwave interactive layer, said receiving means including a smooth surfaced plastic film having sufficient stability at high temperature that it will not degrade when the laminate is subjected to sufficient microwave energy to heat the surface of the quantity of food, and (c) support means for providing structural support for said interactive layer and said plastic fillm, said support means being formed of paper stock material having sufficient structural stability at the high temperature necessary for heating the surface of the quantity of food to maintain its physical shape;

wherein said laminate is formed by the process including the successive steps of laminating said microwave interactive layer onto a smooth surface of said plastic film followed by the step of bonding directly said plastic film upon which said microwave interactive layer has been placed to one side of said paper stock material in a manner to cause said plastic film and said microwave interactive layer to be held in bonded relationship with said support means to cause the surface of a quantity of food, when in heat transfer relationship therewith, to be heated when the laminate is subjected to microwave energy.

20. A laminate according to claim 19, wherein the step of bonding said plastic film to said stock material includes the step of bonding directly to said paper stock material the side of said plastic film upon which said interactive layer has been placed.

21. A laminate according to claim 19, wherein said plastic film is adapted to directly contact the surface of the quantity of food.

22. A laminate according to claim 19, wherein said microwave interactive layer has a thickness of less than about 700 angstroms.

23. A laminate according to claim 19, wherein said microwave interactive layer has a resistivity of greater than about 0.4 ohms per square.

24. A laminate according to claim 19, wherein said laminate includes a tray member of predetermined physical shape.

25. A laminate according to claim 19, wherein said step of laminating includes the step of vacuum vapor depositing said metal onto said plastic film.

26. A laminate according to claim 19, wherein said paper stock material is formed of a material constituting a greater barrier to heat transfer than said plastic film.

27. A food package including a laminate according to claim 10, wherein said food package includes means for at least partially encompassing food to be surface heated by said laminate when exposed to microwave energy.

28. A laminate for use in a disposable container adapted to heat the surface of a quantity of food when exposed to microwave energy, said laminate comprising (a) a continuous microwave interactive layer of elemental metal having a thickness which is sufficiently small to cause said microwave interactive layer, when subjected to microwave energy, to heat up to a temperature which is sufficient to heat the surface of food in heat transfer relationship therewith, (b) a protective means for said microwave interactive layer, said protective means including a smooth surfaced microwave transparent layer having sufficient stability at high temperature that it will not degrade when the laminate is subjected to sufficient microwave energy to heat the surface of the quantity of food, and (c) a support means for providing structural support for said interactive layer and said microwave transparent layer, said support means being formed of paper stock material having sufficient structural stability at the high temperature necessary for heating the surface of the quantity of food to maintain its physical shape;

wherein said laminate is formed by the process including the successive steps of vacuum depositing said microwave interactive layer onto a smooth surface of said microwave transparent layer followed by the step of bonding directly said microwave transparent layer upon which said microwave interactive layer has been vacuum deposited to one side of said paper stock material in a manner to cause said microwave transparent layer and said microwave interactive layer to be held in bonded relationship with said support means to cause the surface of a quantity of food, when in heat transfer relationship therewith, to be heated when the laminate is subjected to microwave energy.

29. A laminate according to claim 28, wherein the step of bonding said microwave transparent layer to said paper stock material includes the step of bonding directly to said paper stock material the side of said microwave transparent layer upon which said interactive layer has been vacuum deposited.

30. A laminate according to claim 28, wherein said microwave transparent layer is adapted to directly contact the surface of the quantity of food.

31. A laminate according to claim 28, wherein said microwave interactive layer has a thickness of less than about 700 angstroms.

32. A laminate according to claim 28, wherein said microwave interactive layer has a resistivity of greater than about 0.4 ohms per square.

33. A laminate according to claim 28, wherein said laminate includes a tray member of predetermined physical shape.

34. A laminate according to claim 28, wherein said step of vacuum depositing includes the step of vacuum vapor depositing said metal onto said microwave transparent layer.

35. A laminate according to claim 28, wherein said paper stock material is formed of a material constituting a greater barrier to heat transfer than said microwave transparent layer.

36. A food package including a laminate according to claim 28, wherein said food package includes means for at least partially encompassing food to be surface heated by said laminate when exposed to microwave energy.

37. A laminate for use in a disposable container adapted to heat the surface of a quantity of food when exposed to microwave energy, said laminate comprising (a) a continuous microwave interactive layer of metal having a thickness which is sufficiently small to cause said microwave interactive layer, when subjected to microwave energy, to heat up to a temperature which is sufficient to heat the surface of food in heat transfer relationship therewith, (b) receiving means for said microwave interactive layer, said receiving means including a smooth surfaced microwave transparent layer having sufficient stability at high temperature that it will not degrade when the laminate is subjected to sufficient microwave energy to heat the surface of the quantity of food, and (c) support means for providing structural support for said microwave interactive layer and said smooth surfaced, microwave transparent layer, said support means being formed of microwave stability at the high temperature necessary for heating the surface of the quantity of food to maintain its physical shape;

wherein said laminate is formed by the process including the successive steps of laminating said microwave interactive layer onto the smooth surface of said smooth surfaced, microwave transparent layer followed by the step of bonding directly said smooth surfaced, microwave transparent layer upon which said microwave interactive layer has been placed to one side of said microwave transparent stock material in a manner to cause said smooth surfaced, microwave transparent layer and said microwave interactive layer to be held in bonded relationship with said support means to cause the surface of a quantity of food, when in heat transfer relationship therewith, to be heated when the laminate is subjected to microwave energy.

38. A laminate according to claim 37, wherein said laminating step comprises the step of vacuum depositing said microwave interactive layer.

39. A food package including a laminate according to claim 37, wherein said food package includes means for at least partially encompassing food to be surface heated by said laminate when exposed to microwave energy.

40. A food package for carrying and heating food including means for surface heating food being exposed to microwave energy, said surface heating means including a laminate having (a) a continuous microwave interactive layer of elemental metal having a thickness which is sufficiently small to cause said microwave interactive layer, when subjected to microwave energy, to heat up to a temperature which is sufficient to heat the surface of food in heat transfer relationship therewith, (b) receiving means for said microwave interactive layer, said receiving means including a smooth surfaced layer having sufficiently stability at high temperature that it will not degrade when the laminate is subjected to sufficient microwave energy to heat the surface of the quantity of food, and (c) support means for providing structural support for said interactive layer and said smooth surfaced layer, said support means being formed of stock material having sufficient structural stability at the high temperature necessary for heating the surface of the quantity of food to maintain its physical shape;

wherein said laminate is formed by the process including the successive steps of placing said microwave interactive layer onto the smooth surface of said smooth surfaced layer followed by the step of bonding directly said smooth surfaced layer upon which said microwave interactive layer has been placed to one side of said stock material in a manner to cause said smooth surfaced layer and said microwave interactive layer to be held in bonded relationship with said support means to cause the surface of a quantity of food, when in heat transfer relationship therewith, to be heated when the laminate is subjected to microwave energy.

* * * * *

UNITED STATES PATENT AND TRADEMARK OFFICE
CERTIFICATE OF CORRECTION

PATENT NO. : 4,825,025
DATED : April 25, 1989
INVENTOR(S) : Oscar E. Seiferth

It is certified that error appears in the above-identified patent and that said Letters Patent is hereby corrected as shown below:

In claim 11, line 3, delete "paper".

In claim 13, line 2, change "les" to -- less --.

In claim 37, line 20, after "microwave" insert
-- transparent stock material having sufficient structural --.

On the title page, in the "References Cited" section, delete the following references:

"3,160,280    12/1964    Burch."
"3,258,649    6/1966     Arguin."
"3,302,350    2/1967     Brown et al.."
"3,850,301    11/1974    Flenige."
"4,002,953    1/1977     Pertetlie."
"4,553,357    11/1985    Pepper."
"Catalog 101, RDI, Snadtrack Sockets, CDPT., 1976, pp. 1-12."

Signed and Sealed this

Fourteenth Day of May, 1991

Attest:

HARRY F. MANBECK, JR.

*Attesting Officer*        *Commissioner of Patents and Trademarks*

UNITED STATES PATENT AND TRADEMARK OFFICE
CERTIFICATE OF CORRECTION

PATENT NO.     : 4,825,025
DATED          : April 25, 1989
INVENTOR(S)    : Oscar E. Seiferth It is certified that error appears in the above-identified patent and that said Letters Patent is hereby corrected as shown below:

<u>Title page,</u>
After Item [*], Notice, delete "The portion of the term of this patent subsequent to Feb. 3, 2004 has been disclaimed." and insert -- This patent is subject to a terminal disclaimer. -- therefor.

Signed and Sealed this

Seventeenth Day of June, 2003

JAMES E. ROGAN
*Director of the United States Patent and Trademark Office*